United States Patent
Kawasumi et al.

(10) Patent No.: US 6,764,741 B2
(45) Date of Patent: Jul. 20, 2004

(54) LAMINATED PRODUCT HAVING SURFACE PROTECTION LAYER

(75) Inventors: Tamio Kawasumi, Chiba (JP); Kazuaki Kouda, Tokyo (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/024,566

(22) Filed: Dec. 21, 2001

(65) Prior Publication Data

US 2002/0090490 A1 Jul. 11, 2002

(30) Foreign Application Priority Data

Dec. 27, 2000 (JP) .......................................... 2000-397585

(51) Int. Cl.[7] .................................................. B32B 5/12
(52) U.S. Cl. ........................ 428/110; 428/109; 428/141
(58) Field of Search ................................. 428/109, 110, 428/908, 8, 141

(56) References Cited

U.S. PATENT DOCUMENTS 4,310,581 A * 1/1982 Felter et al. ................ 428/109

6,468,643 B1 * 10/2002 Kanbayashi et al.

FOREIGN PATENT DOCUMENTS

| JP | 63-113385 | 2/1990 |
| JP | 10-294277 | 7/1999 |
| WO | WO 00/61362 | * 10/2000 |

* cited by examiner

*Primary Examiner*—Alexander S. Thomas
(74) *Attorney, Agent, or Firm*—Burns, Doane, Swecker & Mathis, L.L.P.

(57) ABSTRACT

A laminated product according to the present invention has a fiber reinforced resin layer, an elastic layer laminated on one surface of the fiber reinforced resin layer, and a surface protection layer laminated on a surface of the elastic layer for protecting the surface of the elastic layer. The fiber reinforced resin layer includes at least two prepreg sheets, each of which is formed by impregnating a thermoplastic resin into continuous reinforcing fibers arrayed in one direction such that the volume ratio of the continuous reinforcing fibers is in the range of 40 to 80%. The prepreg sheets are laminated so as to the array directions of the continuous reinforcing fibers at right angles.

17 Claims, 2 Drawing Sheets

LAMINATED PRODUCT HAVING SURFACE PROTECTION LAYER

BACKGROUND OF THE INVENTION

1. Field of the Invention

The present invention relates to a laminated tile or a laminated sheet which exhibits excellent dimensional stability, abrasion resistance and application ability in site and can be suitably used for indoor and outdoor flooring, wall covering and road paving.

2. Description of the Related Art

Generally, floor-covering materials include wood-based, stone-based, fiber-based, resin-based, and rubber-based materials are selectively used depending on property, function and use. Among them, resin-based flooring materials are widely used because of their high mass-productivity.

Typical examples of resin-based flooring materials are a vinyl chloride resin and a urethane-based resin.

The vinyl chloride resin is used in wide applications such as flooring of residences, shops, public services and other broad range of uses because it is inexpensive and has excellent ability in procession and design application. However, as compared with wood-based or stone-based materials, the vinyl chloride resin has a large linear expansion coefficient and contains a large amount of plasticizer, and therefore is inferior in dimensional stability with time after application. Particularly, when the vinyl chloride resin is formed in a tile shape and applied, the tiles made of vinyl chloride resin greatly swell on account of a large coefficient of linear thermal expansion and causes knockout joint area or peeling of the tiles when the tiles are directly heated. Conversely, at extremely low temperatures, the tiles will contract to form gaps in joints.

The urethane-based resin, on the other hand, excellent in impact resistance, abrasion resistance, thermal resistance, chemical resistance, waterproof property and the like, as compared with the vinyl chloride resin. For this reason, the urethane-based resin is used particularly when durability and waterproof property are required, such as veranda, corridors, floors and roofs of factories and public services and other object, and has given actual results as a highly functional flooring material. However, when the urethane-based resin is used as a flooring material, some problems remain unsolved in application ability, i.e., time-consuming coating of the urethane raw material, the long time required for the urethane raw material to cure, i.e., a long curing time, etc., because a field coating method is prevalent, which involves coating or spraying a liquid urethane raw material on substrates in the application site.

On the other hand, a quick curing type urethane raw material, when used, accompanies exothermic heat in the application period. Thus, after curing, volume shrinkage due to hardening of urethane raw materials overlaps volume shrinkage accompanied by temperature reduction. As a result, even though adhesion of the substrate is enough and no peeling is observed in the application period, peeling force acts latently and thus becomes possible, when markedly great external force is applied or when adhesive force is decreased after a long passage of time. In other words, when the urethane-based resin is used as a flooring material, an attempt to improve the application ability would leave anxiety to the dimensional stability and peeling after application.

Then, the present inventors have proposed a laminated product characterized by laminating a urethane-based resin layer on a fiber reinforced resin layer, wherein the fiber reinforced resin layer is obtained by laminating two or more prepreg sheets so as to intersect fiber directions at right angles or obtained by further laminating a nonwoven fabric on one or both surface of the resulting laminating prepreg, and the prepreg sheet is obtained by arranging a continuous reinforcing fiber to one direction and impregnating the arranged fiber with thermoplastic resin so as to make a volume ratio of the reinforcing fiber 50% (see Laid-open Japanese Patent Application No. 192671/99).

This proposed laminated product is excellent in dimensional stability and suitable for use as a flooring material while maintaining the characteristics of the urethane-based resin, i.e., abrasion resistance, impact resistance and the like. In addition, even using the urethane-based resin, this laminated product can be applied without relying on the field coating method, so that the application time can be largely reduced.

Though the foregoing conventional laminated product excels in performance and application ability, there is room for further improvements in the following aspects.

① Stain is more likely to attach on the surface of softer urethane-based resin. Therefore, wax is generally coated on the surface of urethane-based resin for preventing stain from attaching thereon. However, since the wax is easily removed by friction and the like and poor in durability, the wax must be periodically coated again in order to maintain the effect of the wax.

② For giving a cushion effect, urethane-based elastomer may be used, among other urethane-based resins, as a flooring material. Though having the chemical resistance equal to or higher than vinyl chloride resin, the urethane-based elastomer is vulnerable to particular organic solvents. Therefore, if the urethane-based elastomer is exposed to a particular organic solvent for a long time, the urethane-based elastomer may expand to cause swelling and warping of a laminated product as the case may be.

③ It is difficult to apply a pattern on a urethane-based resin by printing or the like. Therefore, a colorful laminated product having a high designability is difficult to fabricate.

④ When a urethane-based resin is used as a flooring material, its elasticity can provide walk feeling with a cushion effect. However, with a conventional laminated product, urethane-based resin layers must be provided on both sides of a fiber reinforced resin layer for improving the cushion effect.

SUMMARY OF THE INVENTION

The primary object of the present invention is to provide a laminated product which is insusceptible to stain attached thereon even without periodic maintenance, and exhibits improved abrasion resistance and chemical resistance, while excelling in dimensional stability and application ability.

Another object of the present invention is to provide a highly designable laminated product on which an arbitrary pattern can be applied, in addition to the foregoing first object.

A further object of the present invention is to provide a laminated product which is capable of giving a sufficient cushion effect by applying a layer for giving cushion only on one side of a fiber reinforced resin layer, in addition to the foregoing first object.

In view of the above-mentioned problems, the present inventors ended up completing the present invention, as a result of diligent investigations repeatedly made on the problems, by laminating an elastic layer on a fiber reinforced resin layer and a surface protection layer further on the elastic layer.

Specifically, a laminated product according to the present invention has a fiber reinforced resin layer, an elastic layer laminated on one surface of the fiber reinforced resin layer, and a surface protection layer laminated on a surface of the elastic layer for protecting the surface of the elastic layer. The fiber reinforced resin layer includes at least two prepreg sheets, each of which is formed by impregnating a thermoplastic resin into continuous reinforcing fibers arrayed in one direction such that a volume ratio of the continuous reinforcing fibers is in a range of 40 to 80%. The prepreg sheets are laminated so as to directions of the continuous reinforcing fibers at right angles.

According to the present invention, by laminating the fiber reinforced resin layer and elastic layer, the fiber reinforced resin layer restricts large expansion and shrinkage of the elastic layer, while the laminated product has a desired elasticity, so that the dimensional stability is maintained during application and after application. Also, during application, the laminated product may simply be adhered on a substrate without requirements for curing and the like, thereby largely reducing application time. Further, since the surface protection layer is laminated on the surface of the elastic layer, the resulting laminated product is insusceptible to the attachment of stain on the surface thereof and excellent in abrasion resistance and chemical resistance, even if the elastic layer is made of an arbitrary material. It is therefore possible to use the laminated product of the present invention suitably for floors, indoor and outdoor walls, road surfaces, and the like.

Also, a colorful laminated product excellent in designability can be provided by using a transparent surface protection layer, and applying a pattern on the surface of the elastic layer on which the surface protection layer is laminated, or by using a transparent surface protection layer and elastic layer and applying a pattern on the surface of the fiber reinforced resin layer on which the elastic layer is laminated. In this event, the surface protection layer is preferably comprised of a film made of a polyamide resin. Similarly, a colorful laminated product can be provided by making up the surface protection layer of a transparent film and a print layer applied on one side of the film, and laminating the print layer on the elastic layer. Likewise, in this event, the film is preferably made of a polyamide resin.

On the other hand, since the surface protection layer is laminated on the surface of the elastic layer, a variety of materials can be used for the elastic layer, such as thermoplastic resins, thermosetting resins, expanded resins and the like. Among these materials, preferred as a material for the elastic layer is a urethane-based resin. Particularly, when the laminated product is used as a flooring material, the bending modulus is preferably equal to or less than 300 Mpa for providing proper walk feeling.

A second elastic layer may be laminated on the surface of the fiber reinforced resin layer opposite to the surface on which the elastic layer is laminated. The second elastic layer is effective in balancing warping forces on both surfaces of the fiber reinforced resin layer to avoid substantially apparent warping and avoid the possible peeling of the laminated product after adherence on a substrate. A backing layer may further be provided for improving the adherence with a substrate during application on the lowermost surface of the laminated product, i.e., on the surface of the fiber reinforced resin layer opposite to the surface on which the elastic layer is laminated when the second elastic layer is not provided, or on the surface of the second elastic layer opposite to the surface on which the fiber reinforced resin layer is laminated when the second elastic layer is provided. The backing layer thus provided can improve the adherence of the laminated product with the substrate during application.

The above and other objects, features and advantages of the present invention will become apparent from the following description with reference to the accompanying drawings which illustrate examples of the present invention.

DESCRIPTION OF THE PREFERRED EMBODIMENTS (First Embodiment)

Figure 1:
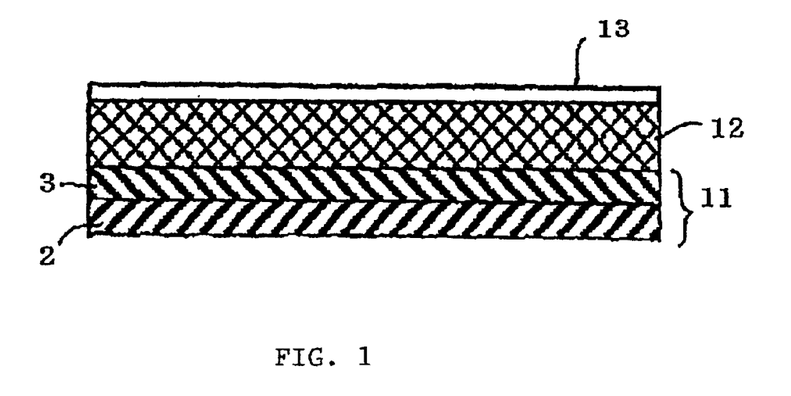
FIG. 1 is a diagram illustrating a cross-sectional structure of a laminated product according to the first embodiment of the present invention.

Referring to FIG. 1, there is illustrated a laminated product according to the first embodiment of the present invention which has fiber reinforced resin layer 11; elastic layer 12 laminated on the top surface of fiber reinforced resin layer 11; and surface protection layer 13 laminated on the top surface of elastic layer 12.

In the following, a detailed description will be made on these fiber reinforced resin layer 11, elastic layer 12 and surface protection layer 13.

First described is fiber reinforced resin layer 11. Fiber reinforced resin layer 11 comprises two prepreg sheets 2, 3 each of which is a continuous reinforcing fiber sheet, the fibers thereof being arranged in one direction and impregnated with a thermoplastic resin of 50% in volume. Two prepreg sheets 2, 3 are laminated so as to intersect fiber direction at right angles.

Illustrative reinforcing fibers used for prepreg sheets 2, 3 may be a glass fiber, a carbon fiber, a boron fiber, a ceramic fiber, and the like, i.e., fibers having high strengths, though not particularly limited thereto. It should be noted that fibers suitable for prepreg sheets 2, 3 have a linear expansion coefficient preferably equal to or less than $2.0 \times 10^{-5}/°$ C., more preferably equal to or less than $1.5 \times 10^{-5}/°$ C., and most preferably equal to or less than $1.0 \times 10^{-5}/°$ C. In view of the dimensional stability, the linear expansion coefficient is preferably as small as possible. It should be noted that since a material having a minus value for the linear expansion coefficient could not be thought of, a lower limit need not be particularly defined for the linear expansion coefficient. Generally, however, fibers used as reinforcing fibers have a linear expansion coefficient equal to or more than $0.05 \times 10^{-5}/°$ C. Among fiber reinforced resin layer 11, elastic layer 12 and surface protection layer 13 which constitute the laminated product, the one which is thought to have the smallest linear expansion coefficient is fiber reinforced resin layer 11, and the linear expansion coefficient of the laminated product itself may be thought to be substantially equal to the linear expansion coefficient of fiber reinforced resin layer 11. Therefore, when reinforcing fibers constituting fiber reinforced resin layer 11 have a linear expansion coefficient equal to or less than $2.0 \times 10^{-5}/°$ C., the laminated product sufficiently satisfies the condition that the linear expansion coefficient is equal to or less than $2.0 \times 10^{-5}/°$ C. Among the aforementioned fibers, the glass fiber may be preferably used as a reinforcing fiber suitable for prepreg sheets 2, 3 in view of the dimensional stability, productivity, and cost of the laminated product.

When a glass fiber is used, a variety of glass fibers conventionally used as glass fibers, such as E-glass, C-glass, A-glass and the like may be used, without being limited to a particular type. However, a glass fiber having a diameter of 5–36 $\mu$m is preferably used in view of the strength and production efficiency of the prepreg sheets 2, 3.

Representative thermoplastic resins which can be used for prepreg sheets 2, 3 may be, for example, polyester resin, polyamide, polyvinyl alcohol, polycarbonate and the like, apart from resins such as polypropylene (hereinafter called "PP"), polyethylene, polystyrene, polyvinyl chloride, and the like. In these materials, PP is preferably used in view of processing ability and cost.

When PP is used, the type of PP is not particularly limited, and homopolymer, block copolymer, random copolymer, or a composite obtained by addition of auxiliary material such as elastomer and filler. These products are commercially available, and such commercially available products may be used. However, in view of production efficiency of prepreg sheets 2, 3, the products having a melt flow index of 10 to 400 g/10 min. at 230° C. are preferably used.

The thermoplastic resin used for prepreg sheets 2, 3 may be preferably incorporated, when needed, with a modifier for enhancing an adhesive strength between the reinforcing fiber and thermoplastic resin, other than a variety of stabilizers such as an antioxidant, a weathering stabilizer, an antistatic agent, and a releasing agent.

A preferred preparation process of prepreg sheets 2, 3 has been disclosed, for example, in Japanese Patent Publication No. 42168/92. In the process, monofilaments of the reinforcing fibers are treated with a coupling agent such as $\gamma$-methacryloxy-propyltrimethoxysilane, and a several hundreds to several thousands of monofilaments are collected to form a yarn. The resulting yarn is paralleled under uniform tension, brought into contact with molten thermoplastic resin and wiped with hot rolls to impregnate thermoplastic resin at a constant velocity. Thus, prepreg sheets 2, 3 have thickness of 50 to 1000 $\mu$m, preferably 100–500 $\mu$m. Prepreg sheets having a thickness less than 50 $\mu$m or more than 1000 $\mu$m is unfavorable because preparation of prepreg sheets 2, 3 are difficult as a result of technical problem.

When two prepreg sheets 2, 3 are laminated so as to intersect fiber direction at right angles, a difference in shrinkage develops between the fiber directions and perpendicular direction thereof and accompanies warping to some extent in laminated prepreg sheets 2, 3. The warping tendency may remain after lamination of the elastic layer 12 depending on adhesion conditions. However in the laminated product, warping is scarcely observed and giving no influence at all on the dimensional stability. Quite no problem develops when adhered to the substrate by way of adhesive agent or pressure sensitive adhesive layer.

As a preferred method for avoiding the above warping tendency, for example, two sheets obtained by laminating two prepreg sheets so as to intersect fiber directions at right angles are further laminated by adhering two surfaces having the same fiber direction to each other to form a laminated sheet consisting of four prepreg sheets. As another example of the preferred method, three prepreg sheets are laminated so as to intersect fiber directions at right angles. Preferred lamination method of prepreg sheets is press molding at melt temperature of the thermoplastic resin adhesion by inserting into pressure rollers which are heated to temperature for melting the thermoplastic resin.

Fiber reinforced resin layer 11 preferably has a sufficient adhesive strength with elastic layer 12. The term sufficient adhesive strength means to have a ply separation strength of more than 5 N/cm in accordance with JIS A1454. When a thermoplastic resin having a ply separation strength with elastic layer 12 equal to or less than 5 N/cm is used for fiber reinforced resin layer 11, it is preferred previously modify the surface of fiber reinforced resin layer 11 in order to increase the adhesion strength with elastic layer 12. Surface modification can be carried out, for example, by fabricating to make the surface of fiber reinforced resin layer 11 irregular, by laminating fiber reinforced resin layer 11 with another material having an irregular surface or a higher adhesive strength with elastic layer 12, by applying a primer to the surface of fiber reinforced resin layer 11, and by applying discharge treatment to the surface of fiber reinforced resin layer 11.

A particularly preferred embodiment in the above surface modification method for laminating at least two prepreg sheets so as to intersect fiber directions at right angles and further laminating nonwoven fabric on the surface on which elastic layer 12 is to be laminated. The nonwoven fabrics have an irregular surface, many of fiber ends knock out from the surface, and an infinite number of gaps further exist on the surface, and thus increase in physical adhesive strength can be expected. Though not particularly limited, materials for the nonwoven fabric used in this case may be polyester, polyamide, PP and the like, and among them, nonwoven fabric made of polyester may be preferably used. Lamination of the nonwoven fabric on the prepreg sheet can be carried out by the same procedures as laminating above the prepreg sheets each other. The amount of a lamination is preferably 5 to 100 g/m$^2$ in the case of polyester nonwoven fabric.

Another particularly preferred embodiment in the above surface modification methods is to laminate at least two prepreg sheets so as to intersect fiber directions at right angles and further to carry out discharge treatment the surface on which elastic layer 12 is to be laminated so as to obtain the surface tension of 400–600 $\mu$N/cm. The term discharge treatment is referred to as carry out corona discharge, arc discharge, or glow discharge on the surface of fiber reinforced resin layer 11 and inceasing surface tension by oxidizing the surface.

The discharge treatment can realize a good adhesion between fiber reinforced resin layer 11 and elastic layer 12. Depending on the discharge treatment conditions, adhesive strength greater than the case of inclusion of the above nonwoven fabric can be obtained. When the surface tension is lower 400 $\mu$N/cm, the treatment condition is unfavorable because a sufficient adhesive strength cannot be obtained. On the other hand, when the surface tension exceeds 600 $\mu$N/cm, the treatment condition is also unfavorable because severe deterioration generates on the surface of fiber reinforced resin layer 11 or blocking and other problems are observed.

Next, elastic layer 12 will be described.

For elastic layer 12, a variety of known resins and resin mixtures may be used without any particular restriction thereto, and reaction curing type, thermoplastic, or thermosetting urethane-based resins are preferably used. The urethane-based resin may be, for example, a high polymer obtained by reacting tolylene diisocyanate, diphenylmethane diisocyanate and other isocyanate compounds with propylene glycol, polyethylene glycol and other polyols. The high polymer is a reaction curing type which liquid raw materials to a solid by crosslinking reaction. In this event, as a crosslinking agent, known curing agents such as 3,3'-dichloro 4,4' diaminodiphenylmethane, for example, can be used. Known catalyst can also be used in order to control the curing velocity.

Also, the elastic layer 12 is not limited to urethane-based resins, for example, a variety of rubbers such as chloroprene rubber, butylene rubber, silicone rubber, acrylic rubber and the like, thermoplastic resins such as ethylene/α-olefin copolymer elastomer and the like, and thermosetting resins such as epoxy resin, phenol resin, melamin resin, unsaturated polyester and the like may be preferably used. Here, the ethylene/α-olefin copolymer elastomer is one type of elastomer which has 10 wt % or more of copolymer component of α-olefin which includes three or more carbons, and illustrative α-olefin may be propylene, butene-1 and pentene-1, all of which can be copolymerized with a known catalyst such as a metallocene-based catalyst.

When the laminated product of this embodiment is used as a flooring material, elastic layer 12 preferably has a bending modulus of 300 MPa or less, more preferably 200 MPa or less, for providing preferable walk feeling. The bending modulus mentioned herein refers to the apparent bending modulus of elastic layer 12, and even if a resin constituting elastic layer 12 essentially has a bending modulus exceeding 300 MPa, the apparent bending modulus may be reduced to 300 MPa or less, for example, by employing a expanded layer for elastic layer 12. Also, the embodiment of elastic layer 12 by such an expanded layer is preferable because the cushion effect is increased, and good walk feeling can be provided as a flooring material. Furthermore, elastic layer 12 implemented by an expanded layer can limit the shrinkage of elastic layer 12, resulting from curing, to some degree and improve the dimensional stability as well.

When elastic layer 12 is implemented by a expanded layer, an illustrative expanded layer may be preferably made of a urethane-based resin with an expansion ratio preferably ranging from 1.5 to 20 times when used as a flooring material. Also, when the expansion ratio is selected within this range as appropriate, a wide range of urethane-based resins can be used from a soft expanded resin to a hard expanded resin. Expanded layers other than that made of a urethane-based resin may be made of thermoplastic resins such as polyethylene, polypropylene, polystyrene and the like.

Other than a variety of resins and resin mixtures listed above, elastic layer 12 can be incorporated, when needed, with a variety of stabilizers such as a weathering stabilizer, a variety of additives such as an antistatic agent, a pigment for coloring and its dispersant, a filler, and the like.

As to the method for laminating reaction curing type urethane-based resin elastic layer 12 on fiber reinforced resin layer 11, when the raw materials are premixed into two components (a main component and a curing agent). The two components are then mixed and applied or sprayed with simultaneous mixing to the surface of fiber reinforced resin layer 11. Alternatively, elastic layer 12 may be previously fabricated as a single layer and laminated on fiber reinforced resin layer 11, in which case an adhesive is required to adhere fiber reinforced resin layer 11 to elastic layer 12.

On the other hand, when a thermoplastic resin is used for elastic layer 12, there are a variety of laminating methods available for elastic layer 12. First, in a batch process, a press machine is used to press elastic layer 12 at a temperature at which the thermosetting resin will melt. In this event, a sheeted thermosetting resin and fiber reinforced resin layer 11 are placed one above the other, and both are sandwiched by the press machine which controls the pressure, temperature and time for pressing such that the thermosetting resin preferably maintains its thickness before pressing. Another preferred embodiment of the pressing may involve preheating fiber reinforced resin layer 11 at or above the temperature at which the thermosetting resin will melt, placing a sheeted thermosetting resin on preheated fiber reinforced resin layer 11, and pressing the resulting laminated product at room temperature. Also, another preferred embodiment of the batch process may be illustrated by a method of adhering a sheeted thermosetting resin, without being melted, to elastic layer 12 with an adhesive, and an insert molding method for use in forming the laminated product into tiles, which involves inserting tile-shaped resin fiber reinforced resin layer 11 into a mold for forming tiles, and then injecting a thermosetting resin into the mold. A preferred continuous process may be illustrated by an extrusion laminate method which employs an extruder such as a T-die for fiber reinforced resin layer 11 to laminate a melt thermoplastic resin.

Further, when a thermosetting resin is used for elastic layer 12, elastic layer 12 may be laminated on fiber reinforced resin layer 11 by a method which involves applying or spraying a liquid thermosetting resin onto fiber reinforced resin layer 11 and curing the applied or sprayed thermosetting resin, and a method which involves previously fabricating elastic layer 12 with a thermosetting resin and laminating fabricated elastic layer 12 on fiber reinforced resin layer 11 using an adhesive, as with the case with elastic layer 12 made of a reaction curing type urethane-based resin. For laminating elastic layer 12 on fiber reinforced resin layer 11, fiber reinforced resin layer 11 is heated when elastic layer 12 is made of a thermoplastic resin, partly for purposes of adhering the fiber reinforced resin layer 11 to elastic layer 12. However, when elastic layer 12 is made of a thermosetting resin, fiber reinforced resin layer 11 need not be heated. Therefore, if fiber reinforced resin layer 11 could be damaged by heat, elastic layer 12 is preferably made of a thermosetting resin.

Next, surface protection layer 13 will be described.

Surface protection layer 13, which is provided for protecting elastic layer 12, is required to have abrasion, stain, and chemical resistance.

A variety of thermoplastic resin films may be used for surface protection layer 13, such as polypropylene, polyethylene, polystyrene, polymethyl methacrylate, polycarbonate, polyamide, polyester and the like. Each of these resins need not be a homo-polymer but may be a copolymer or a mixture. A thermosetting resin film is generally excellent in chemical resistance (solvent resistance).

In these resins, particularly preferred for surface protection layer 13 is a polyamide film which excels in abrasion resistance. Preferably illustrated as polyamide is polyamide which is produced by polymerization of lactam such as nylon 6, nylon 12 and nylon 12 or aminocarboxylate and polycondensation of diamine and carboxylic acid. These materials may be copolymers or mixtures of two or more. A polyamide film is highly superior to urethane-based resins in a Taber abrasion test, and is less susceptible to stain than the urethane-based resins.

Surface protection film 13 need not be a single-layer film, but may be a multi-layer film which comprises a laminated product of two or more films, as required. The thickness of surface protection layer 13 is preferably in a range of 10 to 200 μm. The thickness of less than 10 μm would result in degraded functions required to surface protection layer 13, such as the abrasion resistance. On the other hand, the thickness of exceeding 200 μm would cause surface protection layer 13 itself to be rigid, although the surface protection layer 13 would sufficiently satisfy the function of protecting elastic layer 12, so that the characteristics of elastic film 12 cannot be sufficiently shown.

For improving the adhesive strength with elastic layer 12, surface modification processing is preferably applied on the rear surface (surface on which elastic film 12 is laminated) of surface protection layer 13, similar to that applied to the surface of fiber reinforced resin layer 11. This is particularly important for ensuring a sufficient adhesive strength after lamination when surface protection layer 13 is made of a nonpolar polyolefin-based film such as polypropylene, polyethylene and the like. Further, surface protection layer 13 is preferably formed into an embossed film having an irregular surface to lose the gloss on surface protection layer 13 from the viewpoint of visual effect.

When surface protection layer 13 is made of a transparent film, elastic film 12 can be viewed through the film. Therefore, a pattern may be applied on the surface of elastic layer 12 by printing or the like before surface protection film 13 is laminated, to provide a highly designable laminated product. While the application of a pattern on the surface of elastic layer 12 is difficult when elastic film 12 is made of a urethane-based resin, a pattern may be readily applied on the surface of elastic layer 12 when it is made of a resin other than the urethane-based resin. "Transparent" used herein refers to the light transmissivity equal to or higher than 70% in accordance with JIS K7105. With the light transmissivity equal to or higher than 70%, a pattern can be sufficiently viewed through a film. Also, for fabricating a patterned laminated product, not only the film but elastic layer 12 may be made of a transparent material, such that a pattern may be applied on the surface of fiber reinforced resin layer 11 by printing or the like.

While fiber reinforced resin layer 11, elastic layer 12 and surface protection layer 13 have been described, a pressure sensitive adhesive layer (not shown) may be laminated to fiber reinforced resin layer 11 on the surface opposite to that on which elastic layer 12 is laminated. The lamination of the pressure sensitive adhesive layer permits the laminated product to be adhered on a substrate without using an adhesive during application, thereby making it possible to further reduce application time. Though not particularly limited, the pressure sensitive adhesive layer may be selected in consideration of the adhesivity to the substrate. For example, a rubber-based or an acrylic-based pressure sensitive adhesive layer may be preferably used for a wood-based substrate. For a concrete-based substrate, pressure sensitive adhesive asphalt may be used as the pressure sensitive adhesive layer.

Considering the dimensional stability in respective array directions of the reinforcing fibers included in prepreg sheets 2, 3 of fiber reinforced rein layer 11 in regard to the overall laminated product, at least one of the linear expansion coefficient and thermal dimensional change is preferably within ranges indicated below.

As mentioned above, the linear expansion coefficient is preferably equal to or less than $2.0 \times 10^{-5}/°C$. If the linear expansion coefficient exceeds $2.0 \times 10^{-5}/°C$., the effect of dimensional stability required by the laminated product cannot be sufficiently obtained in some cases. Also, the linear expansion coefficient exceeding $2.0 \times 10^{-5}/°C$. would cause difficulties in differentiation in dimensional stability with conventional polymer tiles made of vinyl chloride resins or the like, most of which have a linear expansion coefficient of $2 \times 10^{-5}/°C$. to $8 \times 10^{-5}/°C$.

The present inventors examined relationships between the phenomenon as knock-out or joint exposure and the linear expansion coefficient of practically applied tiles, and have found that a visually confirmable change does not appear when a dimensional change of the tile is 0.1% or less in a side length of the tile. For this result, assuming that a drastic change in temperature of tiles after application is 50° C. (for example, when boiling water is poured on the tiles), it is critical that the linear expansion coefficient is equal to or less than $2.0 \times 10^{-5}/°C$. in order to prevent knock-out or joint exposure from occurring.

On the other hand, the thermal dimensional change is preferably equal to or less than 0.10%, and more preferably equal to or less than 0.05%. The thermal dimensional change refers to a measured value corresponding to a long-term dimensional change of tiles after application. The thermal dimensional change exceeding 0.10% could fail to sufficiently provide the effect of the dimensional stability required by the laminated product, as is the case with the aforementioned linear expansion coefficient.

The thickness of the laminated product is preferably in a range of 1 to 5 mm. The thickness of the laminated product below 1 mm would result in excessively thin elastic film 12, possibly failing to sufficiently show the characteristics possessed by elastic film 12. On the other hand, the thickness of the laminated product exceeding 5 mm would result in excessively thick elastic layer 12, possibly giving rise to such problems as susceptibility to warping, difficulties in application, and increase in cost. Particularly in the laminated product, the thickness of elastic layer 12 is preferably in a range of 0.3 to 3.0 mm.

For purposes of improving the application ability, the laminated product is preferably in the shape of a sheet having a width ranging from 50 to 2000 mm, or in the shape of a tile, one side of which is 50–2000 mm long. It should be noted however that the shape of the laminated product is not necessarily to a sheet or a tile, i.e., a rectangle or a square, and the dimensional stability required by the present invention can be sufficiently developed irrespective of the shape.

Selected as a method of applying the laminated product may be either of a method which involves previously laminating the aforementioned pressure sensitive adhesive layer on the laminated product, and adhering the laminated product on a substrate in an application site, and a method of applying an adhesive on a substrate or the laminated product in an application site, and adhering the laminated product on the substrate. When using an adhesive, the type of adhesive may be selected in accordance with particular specifications of the laminated product, application of the laminated product, and the type of substrate. The adhesive may be selected, for example, from vinyl-based or urethane-based adhesives and the like for use in conventional copolymer tiles depending on particular applications. Also, including the case where the pressure sensitive adhesive layer is used, the laminated product is preferably applied on a substrate after coating an unevenness adjuster or a primer for holding the adhesive strength depending on the material and surface smoothness of the substrate.

Also, a plurality of laminated products may be joined for application, particularly as is the case with tile-shaped laminated products. In such a case, an application method of the laminated products may involve arranging the laminated products spaced by a gap of 1 to 10 mm as joints, and filling a sealant in the joints. This method is preferably applied for purposes of providing the waterproof property to the joints as well, when the laminated products are water resistant. The sealant for use in this event is not particularly limited as long as it does not cause fracture such as aperture in joints, but is preferably selected from those having a good adhesivity to elastic layer 12 in the joints, for example, denatured silicon, polyurethane, polysulfide, acrylic resin, and the like.

As described above, according to the laminated product of this embodiment, fiber reinforced resin layer 11 which develop the dimensional stability and elastic layer 12 are laminated to provide a desired elasticity, for example, as a flooring material, while fiber reinforced resin layer 11 restricts large expansion and shrinkage of elastic layer 12 caused by temperature change and the like, so that the dimensional stability is maintained as the laminated product even during and after application. As a result, particularly when the laminated product is formed into a tile shape, joints will not suffer from knock-out or joint exposure after application. Further, in regard to the laying of the laminated products, a large reduction in application time, i.e., improved application ability is accomplished as compared with the mainstream flooring method which has been so far employed prevalently for urethane-based resin flooring materials. Also, since surface protection layer 13 is laminated on the surface of elastic layer 12, the laminated product can be insusceptible to stain attached on the surface thereof, and excellent in abrasion resistance and chemical resistance.

(Second Embodiment)

Figure 2:
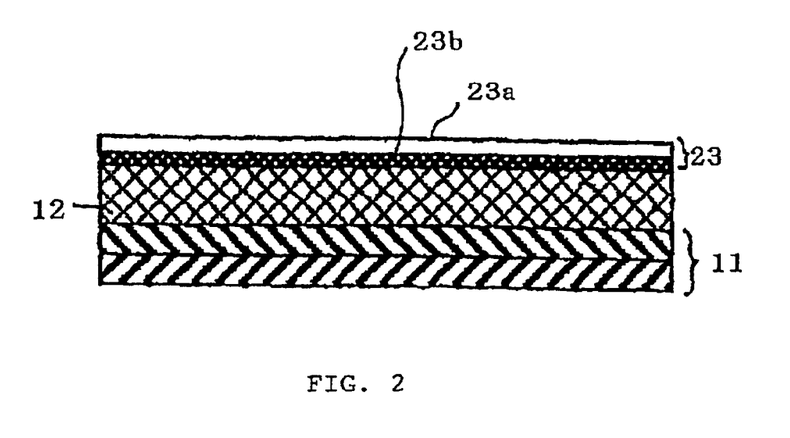
FIG. 2 is a diagram illustrating a cross-sectional structure of a laminated product according to the second embodiment of the present invention.

FIG. 2 is a diagram illustrating a cross-sectional structure of a laminated product according to a second embodiment of the present invention. In FIG. 2, components identical to those in FIG. 1 are designated the same reference numerals.

The laminated product of the second embodiment differs from the first embodiment in the structure of surface protection layer 23. Since fiber reinforced resin layer 11 and elastic layer 12 are similar to the counterparts in the first embodiment, the following description will omit fiber reinforced resin layer 11 and elastic layer 12 and focus on surface protection layer 23 in detail.

Surface protection layer 23 is comprised of transparent film 23a, and print layer 23b applied on the rear surface (the surface adjacent to elastic layer 12) of film 23a. "Transparent" used herein is defined similarly to the first embodiment. Print layer 23b is provided by previously applying a desired color or pattern on the rear surface of film 23a before surface protection layer 23 is laminated on elastic layer 12. Print layer 23b can be readily applied onto film 23a since a known printing method for a general film can be applied thereto.

For film 23a, films similar to those illustrated in the first embodiment may be used within its transparency. Also, the thickness of the film 23a is similar to that defined in the first embodiment.

In the foregoing manner, a colorful laminated product having a high designability can be provided by surface protection layer 23 which has print layer 23b applied on the rear surface of transparent film 23a. Furthermore, since print layer 23b is protected by film 23a, print layer 23b will not peel off as long as film 23a exists or unless surface protection film 23 itself peels off elastic film 12.

(Third Embodiment)

Figure 3:
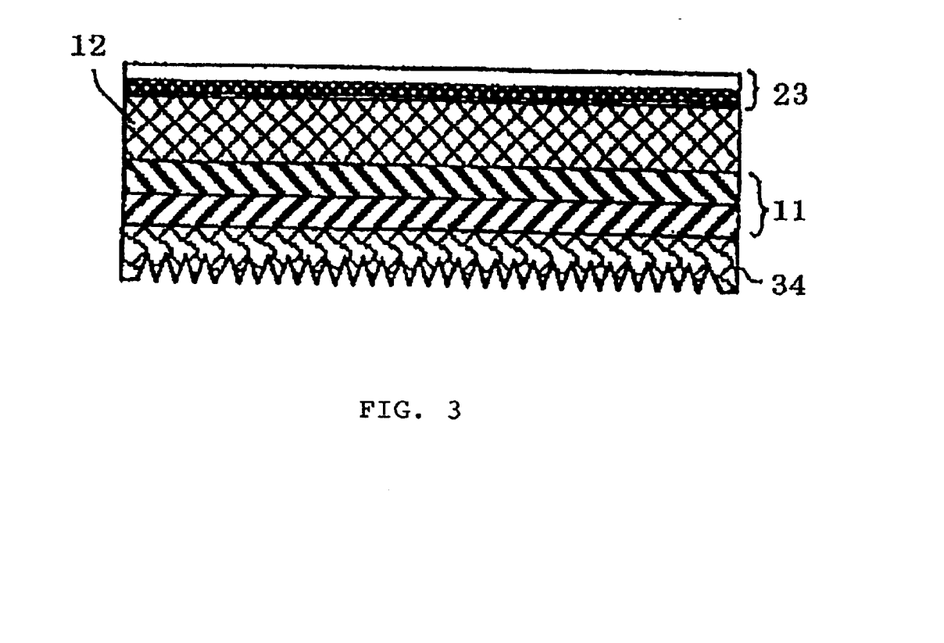
FIG. 3 is a diagram illustrating a cross-sectional structure of a laminated product according to the third embodiment of the present invention.

FIG. 3 is a diagram illustrating a cross-sectional structure of a laminated product according to a third embodiment of the present invention. In FIG. 3, components identical to those in FIG. 1 or 2 are designated the same reference numerals.

The laminated product of the third embodiment comprises fiber reinforced resin layer 11; elastic layer 12 laminated on one surface of fiber reinforced resin layer 11; surface protection layer 23 laminated on this elastic layer 12; and backing layer 34 laminated on the other surface of fiber reinforced resin layer 11.

Fiber reinforced resin layer 11 and elastic layer 12 are similar to those described in the first embodiment, and surface protection layer 23 is similar to that described in the second embodiment, so that fiber reinforced resin layer 11, elastic layer 12 and surface protection layer 23 will be omitted in the following description.

Backing layer 34 is provided for improving the adherence with a substrate when the laminated product is applied thereto. For this purpose, while several examples may be contemplated for backing layer 34, a typical example may be a layer having irregular surface opposite to that on which fiber reinforced resin layer 11 is laminated. Thus, when the laminated product is applied to a substrate using an adhesive, backing layer 34 relieves variations in the thickness of coating of the adhesive applied on the substrate or the laminated product caused by traces of a comb for coating, provides good outgassing during adhesion, and consequently improves the adherence with the substrate. Backing layer 34 having such irregular surface may be, for example, known cheese cloth (mesh fabric made of cotton or staple fiber), nonwoven fabric and the like. Alternatively, other examples of backing layer 34 may be those made of hot melt, asphalt and the like. In this manner, backing layer 34 functions as a pressure sensitive adhesive layer, so that the laminated product can be applied onto a substrate as it is.

By providing backing layer 34 as in the third embodiment, it is possible to improve the adherence with a substrate when the laminated product is applied thereto, and therefore provide a higher application ability.

(Fourth Embodiment)

Figure 4:
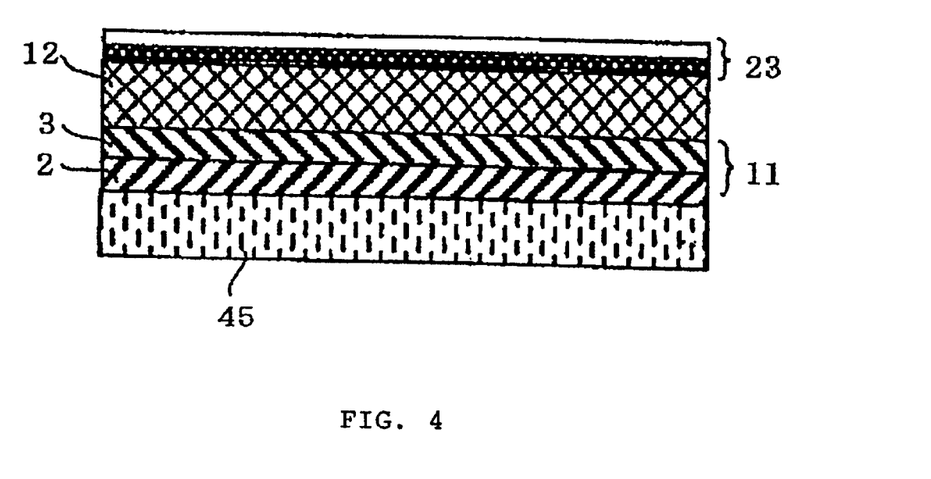
FIG. 4 is a diagram illustrating a cross-sectional structure of a laminated product according to the fourth embodiment of the present invention.

FIG. 4 is a diagram illustrating a cross-sectional structure of a laminated product according to a fourth embodiment of the present invention. In FIG. 4, components identical to those in FIG. 1 or 2 are designated the same reference numerals.

The laminated product of the fourth embodiment comprises fiber reinforced resin layer 11; elastic layer 12 laminated on one surface of fiber reinforced resin layer 11; surface protection layer 23 laminated on elastic layer 12; and second elastic layer 45 of the same type as or a different type from elastic layer 12, laminated on the other surface of fiber reinforced resin layer 11.

Since fiber reinforced resin layer 11, elastic layer 12 and surface protection layer 23 are similar to those described in the third embodiment, these components will be omitted from the following description.

While the dimensional stability required for the laminated product of the present invention can be ensured even without second elastic layer 45, the laminated product may be susceptible to warping. It is believed that the warping is caused by a difference in the amount of dimensional change between prepreg sheets 2, 3 of fiber reinforced resin layer 11 and elastic layer 12. For example, with elastic layer 12 made of a urethane-based resin, if a laminated product without second elastic layer 45 is heated before it is adhered on a substrate, the laminated product tends to warp to be convex because the urethane-based resin expands more than prepreg sheets 2, 3. Further, when the heated laminated product is cooled down to room temperature or lower, the laminated product tends to warp to be concave.

However, such warping will not develop again after the laminated product is adhered on a substrate as long as the adhesive strength is maintained, and will not at all affect the dimensional stability required for the laminated product of the present invention. While the applied laminated product is slightly likely to peel off the substrate under an environment in which it experiences repetitions of drastic temperature changes, or when it does not have a sufficient adhesive strength with the substrate, the laminated product adhered on the substrate can be prevented from possible peeling by the employment of a sandwich structure which has prepreg sheets 2, 3 interposed between elastic layer 12 and second elastic layer 45.

Second elastic layer 45 is laminated with the intention of balancing warping forces on both surfaces of fiber reinforced resin layer 11 to avoid substantially apparent warping and avoid the possible peeling of the laminated product after adhered on a substrate. Based on this concept, ideally, second elastic layer 45 should be made of the same material as elastic layer 12, and the two layers should have the same thickness. However, elastic layer 12 and second elastic layer 45 made of the same material and having the same thickness is not a requisite condition for providing second elastic layer 45. This is because the laminated product of the fourth embodiment can sufficiently provide the dimensional stability and application ability required in the present invention even if elastic layer 12 and second elastic layer 45 are not made of the same material nor have the same thickness, as long as the laminated product is not susceptible to warping.

Additionally, in the fourth embodiment, a backing layer similar to that in the third embodiment may be provided on the surface of second elastic layer 45 opposite to that on which fiber reinforced resin layer 11 is laminated to provide a higher application ability.

Although certain preferred embodiments of the present invention have been shown and described in detail, it should be understood that various changes and modifications may be made without departing from the spirit or scope of the appended claims.

What is claimed is:

1. A laminated product comprising:
    a fiber reinforced resin layer including at least two prepreg sheets each formed by impregnating a thermoplastic resin into continuous reinforcing fibers arrayed in one direction such that a volume ratio of said continuous reinforcing fibers is in a range of 40 to 80%, said prepreg sheets being laminated so as to intersect directions of said continuous reinforcing fibers at right angles;
    an elastic layer laminated on one surface of said fiber reinforced resin layer; and
    a surface protection layer laminated on the surface of said elastic layer for protecting the surface of said elastic layer, wherein the surface protection layer is a film made of polyamide, polyester, or polypropylene.

2. The laminated product according to claim 1, wherein said laminated product has an overall thickness in a range of 1 to 5 mm, and satisfies at least one of a linear expansion coefficient equal to or less than $2.0 \times 10^{-5}$° C. and a thermal dimensional change equal to or less than 0.10% for a dimensional stability in the array direction of said continuous reinforcing fibers.

3. The laminated product according to claim 1, wherein said surface protection layer is a film made of a polyamide resin.

4. The laminated product according to claim 3, wherein said film is an embossed film having an irregular surface.

5. The laminated product according to claim 1, wherein said elastic material is made of a thermosetting resin.

6. The laminated product according to claim 5, wherein said thermosetting resin is a urethane-based resin.

7. The laminated product according to claim 1, wherein said elastic layer is made of a thermoplastic resin.

8. The laminated product according to claim 7, wherein said thermoplastic resin is a urethane-based resin.

9. The laminated product according to claim 1, wherein said elastic layer is a expanded layer.

10. The laminated product according to claim 1, wherein said elastic layer has a bending modulus equal to or less than 300 MPa.

11. The laminated product according to claim 1, further comprising a backing layer laminated on the surface of said fiber reinforced resin layer opposite to the surface on which said elastic layer is laminated for improving an adherence with a substrate during application.

12. The laminated product according to claim 1, further comprising a second elastic layer laminated on the surface of said fiber reinforced resin layer opposite to the surface on which said elastic layer is laminated.

13. The laminated product according to claim 12, further comprising a backing layer laminated on the surface of said second elastic layer opposite to the surface on which said fiber reinforced resin layer is laminated for improving adherence with a substrate during application.

14. A laminated product comprising:
    a fiber reinforced resin layer including at least two prepreg sheets each formed by impregnating a thermoplastic resin into continuous reinforcing fibers arrayed in one direction such that a volume ratio of said continuous reinforcing fibers is in a range of 40 to 80%, said prepreg sheets being laminated so as to intersect directions of said continuous reinforcing fibers at right angles;
    an elastic layer laminated on one surface of said fiber reinforced resin layer; and
    a surface protection layer laminated on the surface of said elastic layer for protecting the surface of said elastic layer, wherein the surface protection aver is made of polyamide, polyester, or polypropylene, said surface protection aver is transparent, and said elastic aver is applied with a pattern on the surface on which said surface protection layer is laminated.

15. A laminated product comprising:
    a fiber reinforced resin layer including at least two prepreg sheets each formed by impregnating a thermoplastic resin into continuous reinforcing fibers arrayed in one direction such that a volume ratio of said continuous reinforcing fibers is in a range of 40 to 80%, said prepreg sheets being laminated so as to intersect directions of said continuous reinforcing fibers at right angles;
    an elastic layer laminated on one surface of said fiber reinforced resin layer; and
    a surface protection layer laminated on the surface of said elastic layer for protecting the surface of said elastic layer, wherein the surface protection layer is made of polyamide, polyester, or polypropylene, said elastic layer and said surface protection aver are transparent, and said fiber reinforced resin layer is applied with a pattern on the surface of on which said elastic layer is laminated.

16. A laminated product comprising:
    a fiber reinforced resin aver including at least two prepreg sheets each formed by impregnating a thermoplastic resin into continuous reinforcing fibers arrayed in one direction such that a volume ratio of said continuous reinforcing fibers is in a range of 40 to 80%, said prepreg sheets being laminated so as to intersect directions of said continuous reinforcing fibers at right angles; an elastic layer laminated on one surface of said fiber reinforced resin layer; and a surface protection layer laminated on the surface of said elastic aver for protecting the surface of said elastic layer, wherein the surface protection layer is made of polyamide, polyester, or polypropylene, said surface protection layer comprises a transparent film and a print layer applied on one side of said film, said print layer being laminated on said elastic layer.

17. The laminated product according to claim 16, wherein said film is made of a polyamide resin.

* * * * *